United States Patent
Lin (10) Patent No.: US 11,145,231 B2
(45) Date of Patent: Oct. 12, 2021

(54) TEST CIRCUIT AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Peixin Lin, Shenzhen (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/042,315

(22) PCT Filed: Dec. 19, 2018

(86) PCT No.: PCT/CN2018/122004
§ 371 (c)(1),
(2) Date: Sep. 28, 2020

(87) PCT Pub. No.: WO2020/077798
PCT Pub. Date: Apr. 23, 2020

(65) Prior Publication Data
US 2021/0020085 A1  Jan. 21, 2021

(30) Foreign Application Priority Data
Oct. 17, 2018  (CN) .......................... 201811212054.9

(51) Int. Cl.
*G09G 3/3225*  (2016.01)
*G09G 3/00*  (2006.01)
(Continued)

(52) U.S. Cl.
CPC .......... *G09G 3/006* (2013.01); *G02F 1/1309* (2013.01); *G09G 3/3677* (2013.01);
(Continued)

(58) Field of Classification Search
CPC ................. G09G 3/006; G09G 3/3677; G09G 2300/0408; G09G 2330/12; G09G 2360/145; G09G 2300/0426; G02F 1/1309
See application file for complete search history.

(56) References Cited

U.S. PATENT DOCUMENTS 6,392,354 B1 * 5/2002 Matsueda ............ G09G 3/2011
 315/169.1
9,047,802 B2 * 6/2015 Kwon ................. H01L 27/3276
(Continued)

FOREIGN PATENT DOCUMENTS

CN  106157858 A  11/2016
CN  106782258 A  5/2017
(Continued)

OTHER PUBLICATIONS

First Office Action in counterpart Chinese Patent Application No. 201811212054.9, dated Nov. 1, 2019.
(Continued)

*Primary Examiner* — Jose R Soto Lopez
(74) *Attorney, Agent, or Firm* — Westbridge IP LLC (57) ABSTRACT

A test circuit and a display device are provided. The test circuit includes N first test pads, N second test pads, a first test circuit, a switching circuit, and a control circuit. The first test circuit is configured to output a plurality of test signals to the test pads. The control circuit outputs a control signal to the switching circuit to control the N first switching circuits to be individually turned on simultaneously, or control the N second switching circuits to be individually
(Continued)

turned on simultaneously, thereby a one-side test of the display panel is achieved. Working states of the N first data lines or the N second data lines are determined according to a brightness of the display panel.

13 Claims, 3 Drawing Sheets

(51) Int. Cl.
  *G02F 1/13* (2006.01)
  *G09G 3/36* (2006.01)
(52) U.S. Cl.
  CPC . *G09G 2300/0408* (2013.01); *G09G 2330/12* (2013.01); *G09G 2360/145* (2013.01)

(56) References Cited

U.S. PATENT DOCUMENTS

| | | | | |
|---|---|---|---|---|
| 9,576,512 | B2* | 2/2017 | Park | G09G 3/006 |
| 2006/0192585 | A1* | 8/2006 | Chen | G09G 3/006 |
| | | | | 324/760.01 |
| 2006/0195736 | A1* | 8/2006 | Hayashi | G09G 3/006 |
| | | | | 714/724 |
| 2007/0001711 | A1* | 1/2007 | Kwak | G09G 3/006 |
| | | | | 324/762.07 |
| 2007/0046316 | A1* | 3/2007 | Uei | G09G 3/006 |
| | | | | 324/760.01 |
| 2007/0120789 | A1* | 5/2007 | Lee | G09G 3/3648 |
| | | | | 345/87 |
| 2007/0120790 | A1* | 5/2007 | Jeon | G09G 3/006 |
| | | | | 345/87 |
| 2007/0139312 | A1* | 6/2007 | Kwak | G09G 3/006 |
| | | | | 345/76 |
| 2007/0262929 | A1* | 11/2007 | Kim | G09G 3/006 |
| | | | | 345/76 |
| 2008/0054798 | A1* | 3/2008 | Jeong | G09G 3/3233 |
| | | | | 313/504 |
| 2008/0203391 | A1* | 8/2008 | Kim | G02F 1/1345 |
| | | | | 257/59 |
| 2008/0284697 | A1* | 11/2008 | Nam | G02F 1/136286 |
| | | | | 345/87 |
| 2009/0256831 | A1* | 10/2009 | Hsu | G09G 3/20 |
| | | | | 345/211 |
| 2009/0267877 | A1* | 10/2009 | Yen | G09G 3/006 |
| | | | | 345/87 |
| 2009/0294771 | A1* | 12/2009 | Kim | G02F 1/1309 |
| | | | | 257/59 |
| 2010/0066383 | A1* | 3/2010 | Chung | G02F 1/1309 |
| | | | | 324/512 |
| 2011/0018571 | A1* | 1/2011 | Kim | G02F 1/1345 |
| | | | | 324/760.02 |
| 2011/0057680 | A1* | 3/2011 | Wang | G09G 3/006 |
| | | | | 324/760.01 |
| 2011/0080173 | A1* | 4/2011 | Kim | G09G 3/006 |
| | | | | 324/403 |
| 2011/0279746 | A1* | 11/2011 | Kim | G09G 3/3648 |
| | | | | 349/54 |
| 2012/0162165 | A1* | 6/2012 | Lee | G09G 3/006 |
| | | | | 345/206 |
| 2013/0335397 | A1* | 12/2013 | Kim | G09G 3/006 |
| | | | | 345/212 |
| 2014/0167769 | A1* | 6/2014 | Kim | G09G 3/006 |
| | | | | 324/414 |
| 2014/0176844 | A1* | 6/2014 | Yanagisawa | G09G 3/006 |
| | | | | 349/43 |
| 2014/0203835 | A1* | 7/2014 | Ro | G09G 3/006 |
| | | | | 324/760.02 |
| 2014/0354285 | A1* | 12/2014 | Kim | G09G 3/3233 |
| | | | | 324/414 |
| 2014/0354286 | A1* | 12/2014 | Kim | G09G 3/3225 |
| | | | | 324/414 |
| 2015/0090961 | A1* | 4/2015 | Lee | G09G 3/006 |
| | | | | 257/40 |
| 2015/0241501 | A1* | 8/2015 | Jang | G09G 3/006 |
| | | | | 324/527 |
| 2015/0347793 | A1* | 12/2015 | Hsiao | G06K 19/0722 |
| | | | | 340/10.5 |
| 2015/0379927 | A1* | 12/2015 | Cai | G09G 3/006 |
| | | | | 345/214 |
| 2016/0043010 | A1* | 2/2016 | Kwak | H01L 51/0024 |
| | | | | 257/48 |
| 2016/0078792 | A1* | 3/2016 | Chang | G01R 31/28 |
| | | | | 324/555 |
| 2016/0225312 | A1* | 8/2016 | Byun | G09G 3/006 |
| 2016/0247436 | A1* | 8/2016 | Lee | G09G 3/2003 |
| 2016/0260367 | A1* | 9/2016 | Kwak | G09G 3/006 |
| 2016/0267826 | A1* | 9/2016 | Seo | G09G 3/006 |
| 2016/0293078 | A1* | 10/2016 | Byun | G09G 3/006 |
| 2016/0322451 | A1* | 11/2016 | Park | G09G 3/006 |
| 2016/0351093 | A1* | 12/2016 | Kim | G09G 3/2092 |
| 2016/0372017 | A1* | 12/2016 | Byun | G09G 3/20 |
| 2017/0141181 | A1* | 5/2017 | Ni | H01L 27/326 |
| 2017/0192318 | A1* | 7/2017 | Wang | G02F 1/13452 |
| 2017/0213490 | A1* | 7/2017 | Jeong | G09G 3/006 |
| 2017/0263880 | A1* | 9/2017 | Lee | H01L 27/3244 |
| 2018/0033354 | A1* | 2/2018 | Lee | G09G 3/006 |
| 2018/0033355 | A1* | 2/2018 | Lee | H01L 27/3276 |
| 2018/0069030 | A1* | 3/2018 | Zhang | H01L 27/14636 |

FOREIGN PATENT DOCUMENTS

| | | |
|---|---|---|
| CN | 108053788 A | 5/2018 |
| CN | 108109566 A | 6/2018 |
| CN | 108427069 A | 8/2018 |

OTHER PUBLICATIONS

International Search Report and Written Opinion in corresponding PCT Application No. PCT/CN2018/122004, dated Jul. 1, 2019.
Second Office Action in counterpart Chinese Patent Application No. 201811212054.9, dated Jul. 1, 2020.

\* cited by examiner

TEST CIRCUIT AND DISPLAY DEVICE

CROSS-REFERENCE TO RELATED APPLICATIONS

The present disclosure is the National Stage of International Application No. PCT/CN2018/122004, filed on Dec. 19, 2018, which claims the benefit of Chinese Patent Application No. 201811212054.9, filed on Oct. 17, 2018 and entitled "Test Circuit and Display Device", the entirety of which is incorporated herein by reference.

FIELD

The present disclosure relates to the field of liquid crystal panel technology, and in particular, to a test circuit and a display device.

BACKGROUND

The statements herein merely provide background information related to the present disclosure and do not necessarily constitute prior art. Display screens may include types of System on Chip (SOC) and Gate Driver on Array (GOA), based on the mode of gate driving. The GOA circuit is important in panel design, and refers to the scan line drive circuit that directly prepared on the array substrate. The GOA circuit includes multiple stages of shift registers that are connected in sequence. Each shift register drives one scan line, and provides a signal to the next stage shift register for turning on, thereby the GOA circuit as a whole is able to turn on the scan lines line by line. The GOA technology not only saves cost, but also saves the binding process in the gate direction, which is extremely advantageous for improving the productivity, and improves the integration of the display panel.

Large-size panels are generally driven by bilateral GOA circuits, namely, GOA circuits are provided on both sides of the array substrate to drive each row of the scan lines on the panel together. In case there is a fault such as short circuit or disconnection at a certain position of the GOA circuit, the subsequent shift registers of each stage will not work normally, resulting in display abnormality. Defects in the functional modules on the array substrate caused during the production process of the array substrate may result in various defects on display which is related to the array substrate, for example, poor display caused by broken scan lines or data lines, or poor display caused by defects in gate or source drive circuits. Therefore, all the pixels on the panel need to be charged simultaneously after the array substrate being manufactured, namely, the Array Test (AT) is performed to detect the signal lines. For the exemplary AT, a plurality of test pads are provided to the panel to be tested, and data signals are written on both sides simultaneously. Then, the pixel intensity on the panel is sensed by a sensor, so as to detect the poor electrical properties of the pixel. The yield rate of production is improved by employing the AT.

However, since the detection signals are simultaneously written to the display panel on both sides, if there is a problem in the writing of the data signal on one side, it may be impossible to know whether there is a problem in the upper data line or the lower data line, thus a misjudgment may occur.

SUMMARY

The main purpose of the present disclosure is to provide a test circuit, aiming to solve the problem that it is impossible to know whether the upper data line is abnormal or the lower data line is abnormal when the data signal writing is abnormal.

In order to achieve the above purpose, the present disclosure provides a test circuit, configured to test a display panel having N first data lines and N second data lines, and the test circuit includes:

N first test pads, configured to connect corresponding the N first data lines;

N second test pads, configured to connect corresponding the N second data lines;

a first test circuit, configured to output a plurality of data signals for testing the display panel to the N first test pads and the N second test pads;

a switching circuit, including N first switching circuits and N second switching circuits, and the N first switching circuits are defined one-to-one on the N first data lines; the N second switching circuits are defined one-to-one on the N second data lines; and a control circuit, configured to control the N first switching circuits to be individually turned on or to control the N second switching circuits to be individually turned on, so as to output the plurality of data signals to the corresponding data lines of the display panel to test the display panel, and to determine whether the N first data lines or the N second data lines are working normally according to a lightening of the display panel.

In one embodiment, the first data lines or the second data lines connect the test pads and pixels on the display panel.

In one embodiment, the test circuit further includes a pixel detection circuit defined on the display panel, and the pixel detection circuit is configured to detect an electric field intensity of the pixels on the display panel or a brightness of the pixels on the display panel when the N first switching circuits are individually turned on or the N second switching circuits are individually turned on, and output a feedback signal to the control circuit for the control circuit to determine whether the N first data lines or the N second data lines are working normally.

In one embodiment, the control circuit is configured to: when the first test circuit outputs the data signals, output a first enable signal to the N first switching circuits to turn on the N first switching circuits and output a second enable signal to the N second switching circuits to turn off the N second switching circuits, and receive the feedback signal output by the pixel detection circuit to compare the feedback signal with a preset electric field intensity value or a preset pixel brightness value, and determine the N first data lines are abnormal when the feedback signal is less than the preset electric field intensity value or the preset pixel brightness value; and output the first enable signal to the N second switching circuits to turn on the N second switching circuits and output the second enable signal to the N first switching circuits to turn off the N first switching circuits, and receive the feedback signal output by the pixel detection circuit to compare the feedback signal with the preset electric field intensity value or the preset pixel brightness value, and determine the N second data lines are abnormal when the feedback signal is less than the preset electric field intensity value or the preset pixel brightness value.

In one embodiment, the test circuit further includes a third test pad and a fourth test pad, and controlled ends of the N first switching circuits are interconnected with a signal output end of the third test pad, and controlled ends of the N second switching circuits are interconnected with a signal output end of the fourth test pad.

In one embodiment, the N first test pads, the N second test pads, the third test pad, and the fourth test pad are disposed side by side and in parallel with the display panel.

In one embodiment, the first switching circuits and the second switching circuits are Metal-Oxide-Semiconductor (MOS) transistors.

In one embodiment, the first switching circuits and the second switching circuits are N-Metal-Oxide-Semiconductor (NMOS) transistors.

In one embodiment, the control circuit and the first test circuit are integrated on a circuit board.

In one embodiment, the control circuit includes a level output circuit and a first control circuit. A first signal output end of the level output circuit is connected with the controlled ends of the N first switching circuits; a second signal output end of the level output circuit is connected with the controlled ends of the N second switching circuits; a controlled end of the level output circuit is connected with a control end of the first control circuit; a signal input end of the first control circuit is connected to a signal output end of the pixel detection circuit.

The present disclosure further provides a test circuit, configured to test a display panel having N first data lines and N second data lines, and the test circuit includes:

N first test pads, configured to connect corresponding the N first data lines;

N second test pads, configured to connect corresponding the N second data lines;

a first test circuit, configured to output a plurality of data signals for testing the display panel to the N first test pads and the N second test pads;

a switching circuit, including N first switching circuits and N second switching circuits, and the N first switching circuits are defined one-to-one on the N first data lines; the N second switching circuits are defined one-to-one on the N second data lines;

a control circuit, configured to control the N first switching circuits to be individually turned on or to control the N second switching circuits to be individually turned on;

a third test pad, configured for the control circuit to output a first control signal to the N first switching circuits, so as to control the N first switching circuits to be turned on or off;

a fourth test pad, configured for the control circuit to output a second control signal to the N second switching circuits, so as to control the N second switching circuits to be turned on or off; and a pixel detection circuit, configured to detect an electric field intensity of the pixels on the display panel or a brightness of the pixels on the display panel when the N first switching circuits are individually turned on or the N second switching circuits are individually turned on, and output a feedback signal to the control circuit for the control circuit to determine whether the N first data lines or the N second data lines are working normally.

The present disclosure further provides a display device, including:

a display panel; and a drive circuit;

the drive circuit includes a test circuit configured to test the display panel having N first data lines and N second data lines, and the test circuit includes:

N first test pads, configured to connect corresponding the N first data lines;

N second test pads, configured to connect corresponding the N second data lines;

a first test circuit, configured to output a plurality of data signals for testing the display panel to the N first test pads and the N second test pads;

a switching circuit, including N first switching circuits and N second switching circuits, and the N first switching circuits are defined one-to-one on the N first data lines; the N second switching circuits are defined one-to-one on the N second data lines; and a control circuit, configured to control the N first switching circuits to be individually turned on or to control the N second switching circuits to be individually turned on, so as to output the plurality of data signals to the corresponding data lines of the display panel to test the display panel, and to determine whether the N first data lines or the N second data lines are working normally according to a lightening of the display panel.

In one embodiment, the first data lines or the second data lines connect the test pads and pixels on the display panel.

In one embodiment, the test circuit further includes a pixel detection circuit defined on the display panel, and the pixel detection circuit is configured to detect an electric field intensity of the pixels on the display panel or a brightness of the pixels on the display panel when the N first switching circuits are individually turned on or the N second switching circuits are individually turned on, and to output a feedback signal to the control circuit for the control circuit to determine whether the N first data lines or the N second data lines are working normally.

In one embodiment, the control circuit is configured to:

when the first test circuit outputs the data signals, output a first enable signal to the N first switching circuits to turn on the N first switching circuits and output a second enable signal to the N second switching circuits to turn off the N second switching circuits, and receive the feedback signal output by the pixel detection circuit to compare the feedback signal with a preset electric field intensity value or a preset pixel brightness value, and determine the N first data lines are abnormal when the feedback signal is less than the preset electric field intensity value or the preset pixel brightness value; and output the first enable signal to the N second switching circuits to turn on the N second switching circuits and output the second enable signal to the N first switching circuits to turn off the N first switching circuits, and receive the feedback signal output by the pixel detection circuit to compare the feedback signal with the preset electric field intensity value or the preset pixel brightness value, and determine the N second data lines are abnormal when the feedback signal is less than the preset electric field intensity value or the preset pixel brightness value.

In one embodiment, the test circuit further includes a third test pad and a fourth test pad, and controlled ends of the N first switching circuits are interconnected with a signal output end of the third test pad, and controlled ends of the N second switching circuits are interconnected with a signal output end of the fourth test pad.

In one embodiment, the N first test pads, the N second test pads, the third test pad, and the fourth test pad are disposed side by side and in parallel with the display panel.

In one embodiment, the first switching circuits and the second switching circuits are Metal-Oxide-Semiconductor transistors.

In one embodiment, the control circuit and the first test circuit are integrated on a circuit board.

In one embodiment, the control circuit includes a level output circuit and a first control circuit. A first signal output end of the level output circuit is connected with the controlled ends of the N first switching circuits; a second signal output end of the level output circuit is connected with the controlled ends of the N second switching circuits; a controlled end of the level output circuit is connected with a control end of the first control circuit; a signal input end of the first control circuit is connected to a signal output end of the pixel detection circuit.

According to the technical solution of the present disclosure, the test circuit includes the N first test pads, the N second test pads, the first test circuit, the switching circuit, and the control circuit. The first test circuit outputs the data signals to the N first data lines of the display panel through the N first test pads, and outputs the data signals to the N second data lines of the display panel through the N second test pads, so as to charge the pixels of the display panel.

The switching circuit includes the N first switching circuits correspondingly defined on the N first data lines, and the N second switching circuits correspondingly defined on the N second data lines. The control signal of the control circuit is output to the switching circuit, so as to control the N first switching circuits to be turned on simultaneously or control the N second switching circuits to be turned on simultaneously, thereby a one-side test on the display panel is implemented. The working states of the N first data lines or the N second data lines are determined according to the brightness of the display panel. Thereby the problem that when the data signal writing is abnormal, it is impossible to know whether the upper data line is abnormal or the lower data line is abnormal has been solved. After the working states of the first data lines and the second data lines being determined, corresponding repairs may be carried out to improve the yield rate of the display panel.

BRIEF DESCRIPTION OF THE DRAWINGS

In order to more clearly illustrate the technical solutions in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

The implementation, functional features and advantages of the present disclosure will be further described with reference to the accompanying drawings.

DETAILED DESCRIPTION OF THE EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of the embodiments. All other embodiments obtained by those of ordinary skill in the art without creative labor based on the embodiments here are within the scope of protection in the present disclosure.

It should be noted that, the descriptions of "first", "second", and the like in the present disclosure are used for the purpose of description only, and are not to be construed as indicating or implying their relative importance or implicitly indicating the number of technical features indicated. Thus, features defining "first" or "second" may include at least one of the features, either explicitly or implicitly. In addition, the meaning of "and/or" appearing in the full text is: including three parallel schemes, taking "A/B" as an example, including the A scheme, or the B scheme, or the scheme in which both A and B are simultaneously satisfied. In addition, the technical solutions between the various embodiments may be combined with each other, but must be based on the realization of those skilled in the art, and when the combination of the technical solutions is contradictory or impossible to implement, it should be considered that the combination of the technical solutions does not exist, nor is it within the scope of protection required by this disclosure.

The present disclosure provides a test circuit, configured to test a display panel 200 having N first data lines L1 and N second data lines L2.

Figure 1:
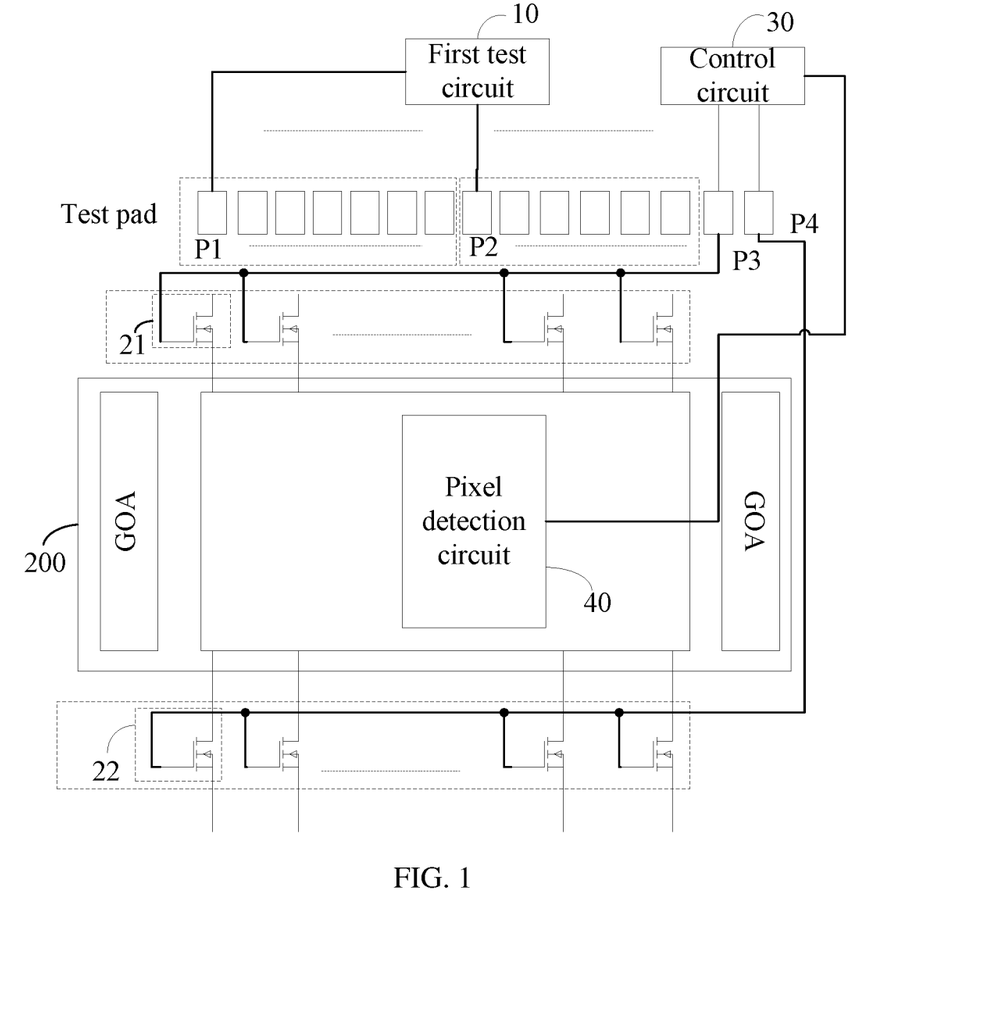
FIG. 1 is a schematic diagram showing functional modules of a test circuit according to one embodiment of the present disclosure.

As shown in FIG. 1, FIG. 1 is a schematic diagram showing functional modules of a test circuit according to one embodiment of the present disclosure. The test circuit includes:

N first test pads P1, configured to connect corresponding the N first data lines L1;

N second test pads P2, configured to connect corresponding the N second data lines L2;

a first test circuit 10, configured to output a plurality of data signals for testing the display panel 200 to the N first test pads P1 and the N second test pads P2;

a switching circuit (not shown), including N first switching circuits 21 and N second switching circuits 22, and the N first switching circuits 21 are defined one-to-one on the N first data lines L1; the N second switching circuits 22 are defined one-to-one on the N second data lines L2;

a control circuit 30, configured to control the N first switching circuits 21 to be individually turned on or to control the N second switching circuits 22 to be individually turned on, so as to output the plurality of data signals to the corresponding data lines of the display panel 200 to test the display panel, and to determine whether the N first data lines L1 or the N second data lines L2 are working normally according to a lightening of the display panel 200.

After the array substrate being manufactured, all the pixels on the panel 200 need to be charged simultaneously, namely, the Array Test (AT) is performed to detect signal lines. For the exemplary AT, a plurality of test pads are provided to the panel to be tested, and data signals are written on both sides simultaneously. In this embodiment, the data signals of the first test circuit 10 are respectively received by the N first data lines L1 and the N second data lines L2 to charge all of the pixels. The first data line L1 or the second data line L2 is a total of the data line between the test pad and the outer edge of the display panel 200 and the data line inside the display panel 200. The plurality of switching circuits in the switching circuit are defined on the data lines between the test pads and the display panel 200. The test pads are defined outside the size of the display panel 200, and are cut after the panel test is completed.

Depending on the panel driven architecture, the first test pads P1 and the second test pads P2 may be distributed on four sides of the display panel 200, or distributed on three sides of the display panel 200, or distributed on two sides of the display panel 200, or distributed on one side of the display panel 200, and may be designed according to actual conditions.

The first test circuit 10 is configured to input the data signals to charge the pixels on the display panel 200 during the array test of the display panel 200, and the first test circuit 10 is connected with the first test pads P1 and the second test pads P2 through a probe. It should be noted that, the control circuit 30 may be integrated with the first test circuit 10 on the same circuit board in order to reduce the volume of the test board during the array test of the display panel 200.

It should be noted that, in case the N first switching circuits 21 in the switching circuit are closed when the control signal output by the control circuit 30 is received, the N second switching circuits 22 need to be kept open. The states of the first switching circuits 21 and the second switching circuits 22 must be kept reversed, so that the first data lines L1 and the second data lines L2 are individually tested. The first switching circuits 21 and the second switching circuits 22 in the switching circuit may be switching components or switching circuits with the shutdown capability, and may be designed according to actual conditions.

When the test circuit is working, gate drive circuits are in normal working states, namely, the drive signal are received normally by the GOA circuits. The control circuit 30 controls the N first switching circuits 21 to be turned on and the N second switching circuits 22 to be turned off. The data signals of the test circuit 10 are input by the N first data lines L1 through the N first test pads P1, and the pixels connected with the N first data lines L1 are charged. Since the second data lines L2 are turned off, all of the pixels connected with the second data lines L2 are not working. Therefore, if the display panel 200 is not lit up or the brightness is dark, it indicates that the N first data lines L1 are abnormal; if the display panel 200 is lit up normally, it indicates that the N first data lines L1 are normal.

Similarly, the control circuit 30 controls the N second switching circuits 22 to be turned on and the N first switching circuits 21 to be turned off. The data signals of the test circuit 10 are input to the N second data lines L2 through the N second test pads P2, and the pixels connected with the N second data lines L2 are charged. Since the first data lines L1 are turned off, all of the pixels connected with the first data lines L1 are not working. Therefore, if the display panel 200 is not lit up or the brightness is dark, it indicates that the N second data lines L2 are abnormal, and if the display panel 200 is lit up normally, it indicates that the N second data lines L2 are normal. The working states of the N first data lines L1 and the N second data lines L2 may be determined through individually turning off or turning on the N first switching circuits 21 and the N second switching circuits 22, which may result in the following four situations:

(1) the N first data lines L1 and the N second data lines L2 are both in a normal state; (2) the N first data lines L1 are in a normal state, and the N second data lines L2 are in an abnormal state; (3) the N second data lines L2 are in a normal state, and the N first data lines L1 are in an abnormal state; (4) the N first data lines L1 and the N second data lines L2 are both in an abnormal state.

Corresponding repairs (usually be a laser processing) may be carried out after the working states of the N first data lines L1 and the N second data lines L2 of the display panel 200 are determined, thereby the yield rate of the display panel 200 is improved.

According to the technical solution of the present disclosure, the test circuit includes the N first test pads P1, the N second test pads P2, the first test circuit 10, the switching circuit, and the control circuit 30. The first test circuit 10 outputs the data signals to the N first data lines L1 of the display panel 200 through the N first test pads P1, and outputs the data signals to the N second data lines L2 of the display panel 200 through the N second test pads P2, so as to charge the pixels of the display panel 200.

The switching circuit includes the N first switching circuits 21 correspondingly defined on the N first data lines L1, and the N second switching circuits 22 correspondingly defined on the N second data lines L2. The control signal of the control circuit 30 is output to the switching circuit, so as to control the N first switching circuits 21 to be individually turned on simultaneously or control the N second switching circuits 22 to be individually turned on simultaneously, thereby a one-side test on the display panel 200 is implemented. The working states of the N first data lines L1 or the N second data lines L2 are determined according to the brightness of the display panel 200. Thereby the problem that when the data signal writing is abnormal, it is impossible to know whether the upper data line is abnormal or the lower data line is abnormal has been solved. After the working states of the first data lines L1 and the second data lines L2 being determined, corresponding repairs may be carried out to improve the yield rate of the display panel 200.

In an optional embodiment, the test circuit further includes a pixel detection circuit 40 defined on the display panel, and the pixel detection circuit 40 is configured to detect an electric field intensity of the pixels or a brightness of the pixels on the display panel 200 when the N first switching circuits 21 are individually turned on or the N second switching circuits 22 are individually turned on, and output a feedback signal to the control circuit 30 for the control circuit 30 to determine whether the N first data lines or the N second data lines are working normally.

The pixel detection circuit 40 is defined on the display panel 200, and may sense the surface electric field intensity of the pixels of the display panel 200 by sensors, or collect the surface brightness of the display panel 200 by a device such as a lighting box, which may be flexibly selected according to actual conditions, no specific restrictions are made herein.

When the test circuit is working, gate drive circuits are in normal working states, namely, the drive signal is received normally by the GOA circuits. The control circuit 30 controls the N first switching circuits 21 to be turned on and the N second switching circuits 22 to be turned off. The data signals of the test circuit 10 are input to the N first data lines L1 through the N first test pads P1, and the pixels connected with the N first data lines L1 are charged. At this time, the electric field intensity or brightness of the pixels are detected by the pixel detection circuit 40. Since the second data lines L2 are turned off, all of the pixels connected with the second data lines L2 are not working. Therefore, if the feedback signal output by the pixel detection circuit 40 is smaller than the preset value, it indicates that the N first data lines L1 are abnormal; if the feedback signal is larger than the preset value, it indicates that the N first data lines L1 are normal.

Similarly, the control circuit 30 controls the N second switching circuits 22 to be turned on and the N first switching circuits 21 to be turned off. The data signals of the test circuit 10 are input to the N second data lines L2 through the N second test pads P2, and the pixels connected with the N second data lines L2 are charged. At this time, the electric field intensity or brightness of the pixels are detected by the pixel detection circuit 40. Since the first data lines L1 are turned off, all of the pixels connected with the first data lines L1 are not working. Therefore, if the feedback signal output by the pixel detection circuit 40 is smaller than the preset value, it indicates that the N second data lines L2 are abnormal; if the feedback signal is larger than the preset value, it indicates that the N second data lines L2 are normal.

In an optional embodiment, the control circuit 30 is specifically configured to:

when the data signals are output by the first test circuit 10, output a first enable signal to the N first switching circuits 21 to turn on the N first switching circuits 21 and output a second enable signal to the N second switching circuits 22 to turn off the N second switching circuits 22, and receive the feedback signal output by the pixel detection circuit 40 to compare the feedback signal with a preset electric field intensity value or a preset pixel brightness value, and determine the N first data lines L1 are abnormal when the feedback signal is less than the preset electric field intensity value or the preset pixel brightness value; and output the first enable signal to the N second switching circuits 22 to turn on the N second switching circuits 22 and output the second enable signal to the N first switching circuits 21 to turn off the N first switching circuits 21, and receive the feedback signal output by the pixel detection circuit 40 to compare the feedback signal with the preset electric field intensity value or the preset pixel brightness value, and determine the N second data lines L2 are abnormal when the feedback signal is less than the preset electric field intensity value or the preset pixel brightness value.

In this embodiment, the control circuit 30 usually turns on the N first switching circuits 21 and the N second switching circuits 22 in two steps, and individually tests the connected data lines. The first switching circuits 21 may be defined at the upper end or the lower end of the display panel 200. Similarly, the second switching circuits 22 may be defined at the lower end or the upper end of the display panel 200. The first enable signal may be a high level or a low level, and the second enable signal may be a low level or a high level accordingly. When the test circuit is working, gate drive circuits are all in normal working states. The control circuit 30 outputs the first enable signal to control the N first switching circuits 21 to be turned on, and outputs the second enable signal to control the N second switching circuits 22 to be turned off. Assuming that the first enable signal is the high level and the second enable signal is the low level, the data signals of the test circuit 10 are input to the N first data lines L1 through the N first test pads P1, and the pixels connected with the N first data lines L1 are charged. At this time, the electric field intensity or brightness of the pixels are detected by the pixel detection circuit 40. Since the second data lines L2 are turned off, all of the pixels connected with the second data lines L2 are not working. Therefore, if the feedback signal output by the pixel detection circuit 40 is smaller than the preset electric field intensity value or the preset pixel brightness value, it indicates that the N first data lines L1 are abnormal; if the feedback signal is larger than the preset electric field intensity value or the preset pixel brightness value, it indicates that the N first data lines L1 are normal;

After the N first data lines are determined, the control circuit 30 outputs the second enable signal to control the N first switching circuits 21 to be turned off and outputs the first enable signal to control the N second switching circuits 22 to be turned on. The data signals of the test circuit 10 are input to the N second data lines L2 through the N second test pads P2, and the pixels connected with the N second data lines L2 are charged. At this time, the electric field intensity or brightness of the pixels are determined by the pixel detection circuit 40. Since the first data lines L1 are turned off, all of the pixels connected with the first data lines L1 are not working. Therefore, if the feedback signal output by the pixel detection circuit 40 is smaller than the preset value, it indicates that the N second data lines L2 are abnormal; if the feedback signal is larger than the preset electric field intensity value or the preset pixel brightness value, it indicates that the N second data lines L2 are normal.

In an optional embodiment, a third test pad P3 and a fourth test pad P4 are further included, and controlled ends of the N first switching circuits 21 are interconnected with a signal output end of the third test pad P3, and controlled ends of the N second switching circuits 22 are interconnected with a signal output end of the fourth test pad P4.

In this embodiment, in order to reduce the output ports of the control circuit 30 and avoid circuit clutter, the control circuit 30 outputs the control signal to the corresponding first switching circuits 21 and the corresponding second switching circuits 22 through the third test pad P3 and the fourth test pad P4, respectively. In addition, the controlled ends of the N first switching circuits 21 are connected in parallel, and then be interconnected with the third test pad P3; the controlled ends of the N second switching circuits 22 are connected in parallel, and then be interconnected with the fourth test pad P4. Thereby the wiring structure is simplified and the design cost is reduced.

In an optional embodiment, the N first test pads P1, the N second test pads P2, the third test pad P3, and the fourth test pad P4 are defined side by side and in parallel with the display panel 200.

In this embodiment, the plurality of test pads are defined in a row, and are defined outside the size of the display panel 200 and parallel to the display panel 200. Therefore, the connecting lines between the control circuit 30 and the third test pad P3 and between the control circuit 30 and the fourth test pad P4 may be designed to be shorter, so as to simplify the wiring structure and reduce the design cost.

In an optional embodiment, the first switching circuits 21 and the second switching circuits 22 are MOS transistors.

In this embodiment, gates of the MOS transistors are respectively connected with the third test pad P3 and the fourth test pad P4, and the high levels or low levels are output by the test pads to control the MOS transistors to be turned on or off. The data signals are received by drains or sources of the MOS transistors, and are output from the source or the drain of each MOS transistor to each pixel of the display panel 200, so as to charge the pixels on the same side of display panel 200 individually. The MOS transistor may be NMOS transistor or PMOS transistor, which may be selected according to specific conditions.

In an optional embodiment, the switching circuits are NMOS transistors.

In this embodiment, gates of the NMOS transistors are respectively connected with the third test pad P3 and the fourth test pad P4, and the high levels are output by the test pads to control the NMOS transistors to be turned on or output the low levels to control the NMOS transistors to be turned off. The data signals are received by drains or sources of the NMOS transistors, and are output from the source of each NMOS transistor to each pixel of the display panel 200, so as to charge the pixels on the same side of display panel 200 individually. Each NMOS transistor is turned on or off on one side respectively according to the different control signals received, so as to individually detect the data lines.

Figure 2:
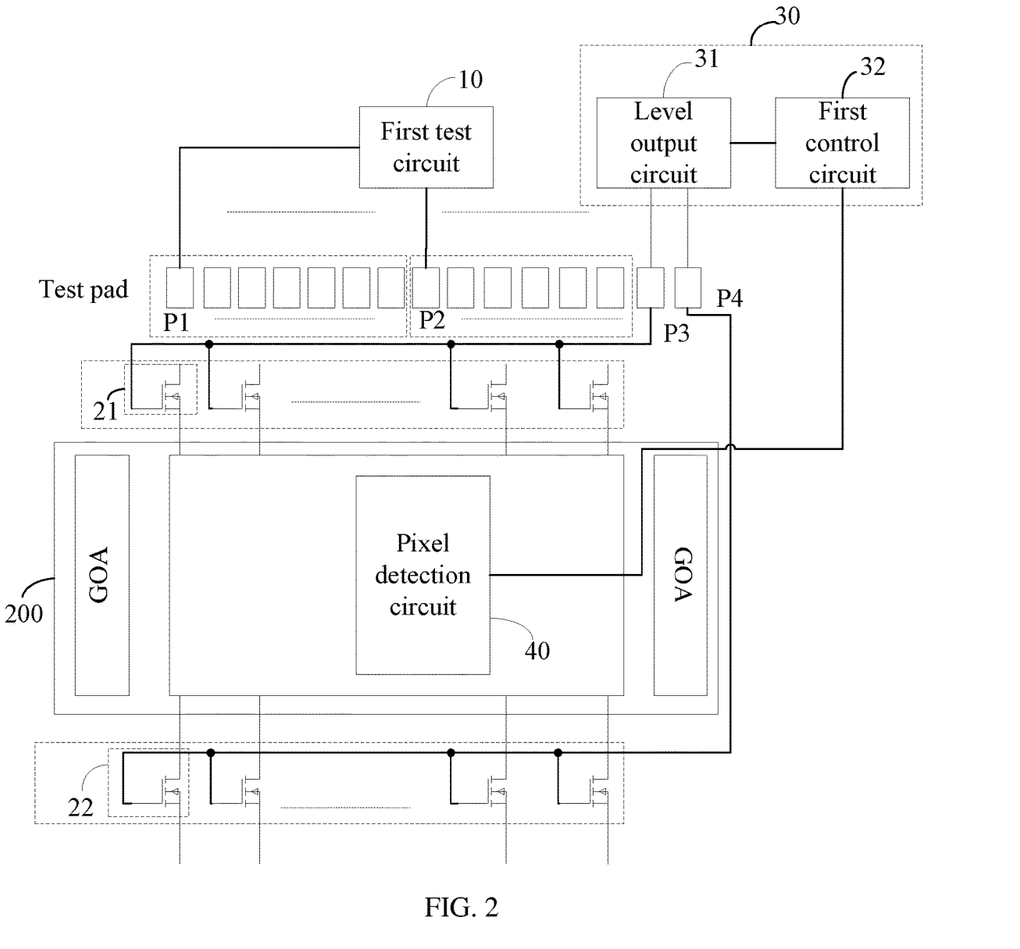
FIG. 2 is a schematic diagram showing functional modules of the test circuit according to another embodiment of the present disclosure.

As shown in FIG. 2, FIG. 2 is a schematic diagram showing functional modules of the test circuit according to another embodiment of the present disclosure. In an optional embodiment, the control circuit 30 includes a level output circuit 31 and a first control circuit 32. A first signal output end of the level output circuit 31 is connected with the controlled ends of the N first switching circuits 21; a second signal output end of the level output circuit 31 is connected with the controlled ends of the N second switching circuits 22; a controlled end of the level output circuit 31 is connected with a control end of the first control circuit 32; a signal input end of the first control circuit 32 is connected to a signal output end of the pixel detection circuit 40.

In this embodiment, the level output circuit 31 is controlled by the control signal output by the first control circuit 32. The level output circuit 31 includes a first level output port and a second level output port. The first level output port is connected with the controlled ends of the N first switching circuits 21 through the third test pad P3, and the second level output port is connected with the controlled ends of the N second switching circuits 22 through the fourth test pad P4. The first control circuit 32 is configured to receive the feedback signal output by the pixel detection circuit 40 and compare it with the preset electric field intensity value or the preset brightness value. The first control circuit 32 controls the level output circuit 31 to output high levels or low levels to control the first switching circuit 21 or the second switching circuit 22 to be individually turned on or off, so as to determine the working states of the first data lines L1 and the second data lines L2. The level output circuit 31 may be a signal generator, a level shifter, or other circuits or components. The first control circuit 32 may be a microprocessor, a programmable controller, etc.

Further, the control circuit 30 may further be integrated with the first test circuit 10 on the same circuit board, or integrated in the same chip, thereby the structure of the test circuit is further simplified.

In an optional embodiment, the control circuit 30 is further connected with a terminal device, and feeds back the working state of the first data lines L1 and the working state of the second data lines L2 to the terminal device.

In this embodiment, the control circuit 30 drives the pixels corresponding to the first data lines L1 and the pixels corresponding to the second data lines L2. The working states of the first data lines L1 and the second data lines L2 are determined according to the feedback signal output by the pixel detection circuit 40, and then are expressed as 1 and 0 or as characters by the control circuit 30. For example, when 1 and 0 are used, 1 indicates that the data lines are normal, and 0 indicates that the data lines are abnormal, and the corresponding table may be output to the terminal device to be displayed through the display. The control circuits 30 may output 1 and 1, 1 and 0, 0 and 1, 0 and 0 according to different states of the first data lines L1 and the second data lines L2. The tester may judge which end of the data lines are abnormal according to the values, and then carry out corresponding repairs, thereby the yield rate of the display panel 200 is improved.

The present disclosure further provides a test circuit, configured to test a display panel 200 having N first data lines L1 and N second data lines L2, and the test circuit includes:

N first test pads P1, configured to connect corresponding the N first data lines L1;

N second test pads P2, configured to connect corresponding the N second data lines L2;

a first test circuit 10, configured to output a plurality of data signals for testing the display panel 200 to the N first test pads P1 and the N second test pads P2;

a switching circuit, including N first switching circuits 21 and N second switching circuits 22, and the N first switching circuits 21 are defined one-to-one on the N first data lines L1; the N second switching circuits 22 are defined one-to-one on the N second data lines L2;

a control circuit 30, configured to control the N first switching circuits 21 to be individually turned on or to control the N second switching circuits 22 to be individually turned on;

a third test pad P3, configured for the control circuit 30 to output a first control signal to the N first switching circuits 21, so as to control the N first switching circuits 21 to be turned on or off;

a fourth test pad P4, configured for the control circuit 30 to output a second control signal to the N second switching circuits 22, so as to control the N second switching circuits 22 to be turned on or off;

a pixel detection circuit 40, configured to detect an electric field intensity of the pixels or a brightness of the pixels on the display panel 200 when the N first switching circuits 21 are individually turned on or the N second switching circuits 22 are individually turned on, and output a feedback signal to the control circuit 30 for the control circuit 30 to determine whether the N first data lines L1 or the N second data lines L2 are working normally.

Figure 3:
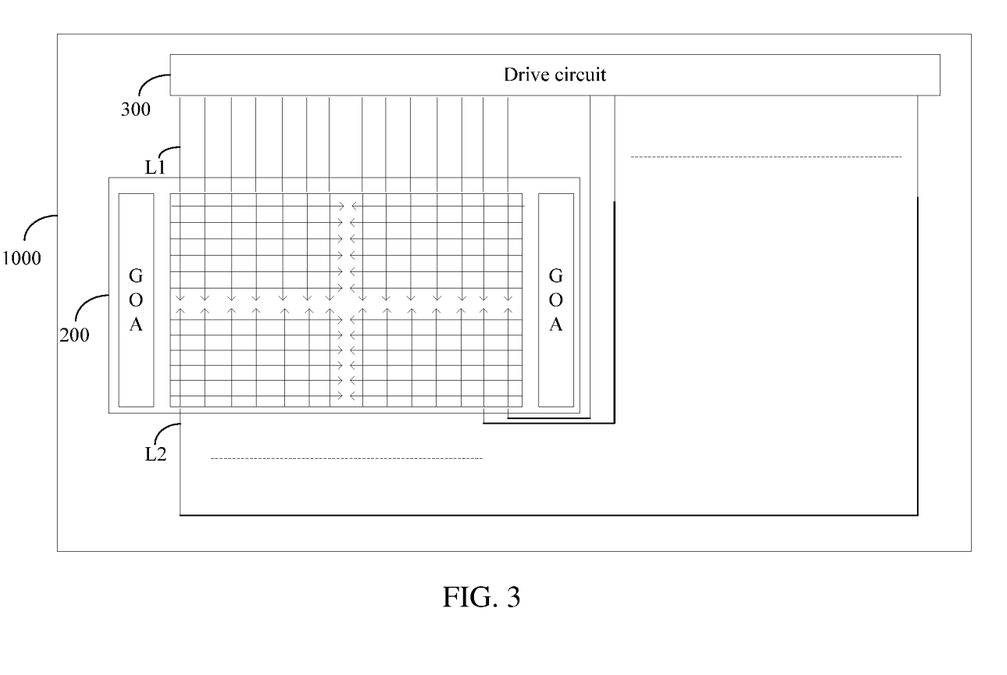
FIG. 3 is a schematic diagram showing functional modules of a display device according to one embodiment of the present disclosure.

As shown in FIG. 3, FIG. 3 is a schematic diagram showing functional modules of a display device according to one embodiment of the present disclosure. The present disclosure further provides a display device 1000, including a display panel 200 and a drive circuit 300. The drive circuit 300 includes the test circuit as described above, and the specific structure of the test circuit refers to the above embodiments. Since the drive circuit 300 adopts all the technical solutions of all the above embodiments, it has at least all the technical effects brought by the technical solutions of the above embodiments, which are not repeated herein.

The drive circuit 300 outputs the drive signal to the display panel 200 to drive the panel, and is able to detect the N first data lines L1 and the N second data lines L2 of the display panel 200, so as to perform corresponding repairs after the working states of the N first data lines L1 and the N second data lines L2 are determined, thereby the yield rate of the display panel 200 is improved.

The above descriptions are only alternative embodiments of the present disclosure, and is not intended to limit the scope of the disclosure of the present disclosure. All the equivalent structural transformation made by the disclosure specification and the attached drawings under the idea of the disclosure, or directly/indirectly used in other relevant technical fields are included in the patent protection scope of the disclosure.

What is claimed is:

1. A test circuit, configured to test a display panel having N first data lines and N second data lines, wherein the test circuit comprises:

N first test pads, configured to connect corresponding the N first data lines;

N second test pads, configured to connect corresponding the N second data lines;

a first test circuit, configured to output a plurality of data signals for testing the display panel to the N first test pads and the N second test pads;

a switching circuit, comprising N first switching circuits and N second switching circuits, the N first switching circuits being defined one-to-one on the N first data lines, the N second switching circuits being defined one-to-one on the N second data lines;

a control circuit, configured to control the N first switching circuits to be individually turned on or to control the N second switching circuits to be individually turned on, to output the plurality of data signals to the corresponding data lines of the display panel to test the display panel, and to determine whether the N first data lines or the N second data lines are working normally according to a lightening of the display panel; and a pixel detection circuit defined on the display panel, wherein the pixel detection circuit is configured to detect an electric field intensity of the pixels on the display panel or a brightness of the pixels on the display panel when the N first switching circuits are individually turned on or the N second switching circuits are individually turned on, and to output a feedback signal to the control circuit for the control circuit to determine whether the N first data lines or the N second data lines are working normally;

wherein the control circuit comprises a level output circuit and a first control circuit, a first signal output end of the level output circuit being connected with the controlled ends of the N first switching circuits, a second signal output end of the level output circuit being connected with the controlled ends of the N second switching circuits, a controlled end of the level output circuit being connected with a control end of the first control circuit, a signal input end of the first control circuit being connected to a signal output end of the pixel detection circuit; and the control circuit is further configured to:

when the first test circuit outputs the data signals, output a first enable signal to the N first switching circuits to turn on the N first switching circuits and output a second enable signal to the N second switching circuits to turn off the N second switching circuits, and receive the feedback signal output by the pixel detection circuit to compare the feedback signal with a preset electric field intensity value or a preset pixel brightness value, and determine the N first data lines are abnormal when the feedback signal is less than the preset electric field intensity value or the preset pixel brightness value; and output the first enable signal to the N second switching circuits to turn on the N second switching circuits and output the second enable signal to the N first switching circuits to turn off the N first switching circuits, and receive the feedback signal output by the pixel detection circuit to compare the feedback signal with the preset electric field intensity value or the preset pixel brightness value, and determine the N second data lines are abnormal when the feedback signal is less than the preset electric field intensity value or the preset pixel brightness value.

2. The test circuit of claim 1, wherein the first data lines or the second data lines connect the test pads and pixels on the display panel.

3. The test circuit of claim 1, wherein the test circuit further comprises a third test pad and a fourth test pad, controlled ends of the N first switching circuits being interconnected with a signal output end of the third test pad, controlled ends of the N second switching circuits being interconnected with a signal output end of the fourth test pad.

4. The test circuit of claim 3, wherein the N first test pads, the N second test pads, the third test pad, and the fourth test pad are disposed side by side and in parallel with the display panel.

5. The test circuit of claim 1, wherein the first switching circuits and the second switching circuits are Metal-Oxide-Semiconductor transistors.

6. The test circuit of claim 5, wherein the first switching circuits and the second switching circuits are N-Metal-Oxide-Semiconductor transistors.

7. The test circuit of claim 1, wherein the control circuit and the first test circuit are integrated on a circuit board.

8. A display device, wherein the display device comprises:
a display panel; and
a drive circuit;
wherein the drive circuit comprises a test circuit configured to test the display panel having N first data lines and N second data lines, the test circuit comprising:

N first test pads, configured to connect corresponding the N first data lines;

N second test pads, configured to connect corresponding the N second data lines;

a first test circuit, configured to output a plurality of data signals for testing the display panel to the N first test pads and the N second test pads;

a switching circuit, comprising N first switching circuits and N second switching circuits, the N first switching circuits being defined one-to-one on the N first data lines, the N second switching circuits being defined one-to-one on the N second data lines;

a control circuit, configured to control the N first switching circuits to be individually turned on or to control the N second switching circuits to be individually turned on, to output the plurality of the data signals to the corresponding data lines of the display panel to test the display panel, and to determine whether the N first data lines or the N second data lines are working normally according to a lightening of the display panel; and a pixel detection circuit defined on the display panel, wherein the pixel detection circuit is configured to detect an electric field intensity of the pixels on the display panel or a brightness of the pixels on the display panel when the N first switching circuits are individually turned on or the N second switching circuits are individually turned on, and to output a feedback signal to the control circuit for the control circuit to determine whether the N first data lines or the N second data lines are working normally;

wherein the control circuit comprises a level output circuit and a first control circuit, a first signal output end of the level output circuit being connected with the controlled ends of the N first switching circuits, a second signal output end of the level output circuit being connected with the controlled ends of the N second switching circuits, a controlled end of the level output circuit being connected with a control end of the first control circuit, a signal input end of the first control circuit being connected to a signal output end of the pixel detection circuit, and the control circuit is further configured to:

when the first test circuit outputs the data signals, output a first enable signal to the N first switching circuits to turn on the N first switching circuits and output a second enable signal to the N second switching circuits to turn off the N second switching circuits, and receive the feedback signal output by the pixel detection circuit to compare the feedback signal with a preset electric field intensity value or a preset pixel brightness value, and determine the N first data lines are abnormal when the feedback signal is less than the preset electric field intensity value or the preset pixel brightness value; and output the first enable signal to the N second switching circuits to turn on the N second switching circuits and output the second enable signal to the N first switching circuits to turn off the N first switching circuits, and receive the feedback signal output by the pixel detection circuit to compare the feedback signal with the preset electric field intensity value or the preset pixel brightness value, and determine the N second data lines are abnormal when the feedback signal is less than the preset electric field intensity value or the preset pixel brightness value.

9. The display device of claim 8, wherein the first data lines or the second data lines connect the test pads and pixels on the display panel.

10. The display device of claim 8, wherein the test circuit further comprises a third test pad and a fourth test pad, controlled ends of the N first switching circuits being interconnected with a signal output end of the third test pad, controlled ends of the N second switching circuits being interconnected with a signal output end of the fourth test pad.

11. The display device of claim 10, wherein the N first test pads, the N second test pads, the third test pad, and the fourth test pad are disposed side by side and in parallel with the display panel.

12. The display device of claim 8, wherein the first switching circuits and the second switching circuits are Metal-Oxide-Semiconductor transistors.

13. The display device of claim 8, wherein the control circuit and the first test circuit are integrated on a circuit board.

* * * * *